Dec. 15, 1931.  H. L. BLYDENBURGH  1,836,359
CLUTCH MECHANISM FOR POWER DRIVEN LAWN MOWERS
Filed May 26, 1930   3 Sheets-Sheet 1

Inventor
Harold L. Blydenburgh,
By
Attorney

Dec. 15, 1931.  H. L. BLYDENBURGH  1,836,359
CLUTCH MECHANISM FOR POWER DRIVEN LAWN MOWERS
Filed May 26, 1930  3 Sheets-Sheet 2

Inventor
Harold L. Blydenburgh,
By
Attorneys

Dec. 15, 1931. H. L. BLYDENBURGH 1,836,359
CLUTCH MECHANISM FOR POWER DRIVEN LAWN MOWERS
Filed May 26, 1930 3 Sheets-Sheet 3
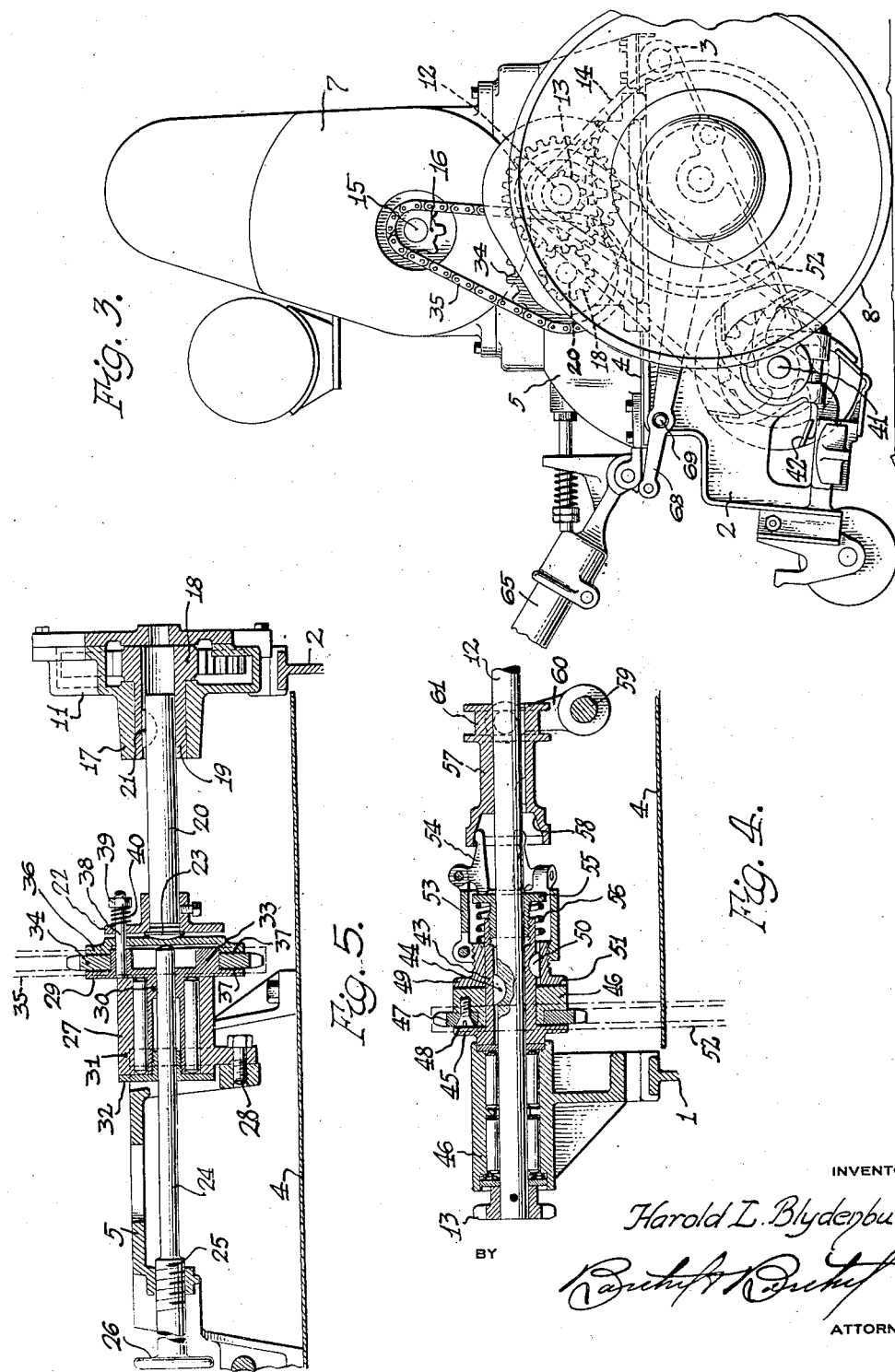
INVENTOR
Harold L. Blydenburgh
BY
ATTORNEYS Patented Dec. 15, 1931

1,836,359

UNITED STATES PATENT OFFICE

HAROLD L. BLYDENBURGH, OF DETROIT, MICHIGAN, ASSIGNOR TO THE MOTO-MOWER CO., OF DETROIT, MICHIGAN, A CORPORATION OF MICHIGAN

CLUTCH MECHANISM FOR POWER DRIVEN LAWN MOWERS

Application filed May 26, 1930. Serial No. 455,639.

The present invention pertains to novel clutch mechanism for power driven lawn mowers and is directed particularly to clutches for the main driven shaft and the cutter shaft.

Power lawn mowers have already been constructed with separate clutches for the ground wheels, whereby the machine may be steered by separately disengaging these clutches. It is often desired however to disconnect the ground wheels entirely from the motor, so that the latter may run without driving the wheels, as in passing over a surface not to be mowed but not of sufficient extent to warrant shutting off the motor. Accordingly, the present invention contemplates the insertion of a clutch between the motor and the driven shaft which propels the ground wheels.

Another object of the invention is to provide for the operation of the cutter through gearing connecting the same to the ground wheels and at the same time to permit disconnection of the cutter from the ground wheels without shutting off the motor. With such an arrangement it becomes possible to propel the ground wheels under power without necessarily operating the cutter, and with this object in view, the invention further provides another clutch inserted between the cutter and the driven shaft which propels the ground wheels.

The invention is fully disclosed by way of examples in the following description and in the accompanying drawings, in which—

Fig. 3 is an end elevation;

Fig. 4 is a section on the line 4—4 of Figure 1; and

Fig. 5 is a section on the line 5—5 of Figure 1.

Reference to these views will now be made by use of like characters which are employed to designate corresponding parts throughout.

Figure 1:
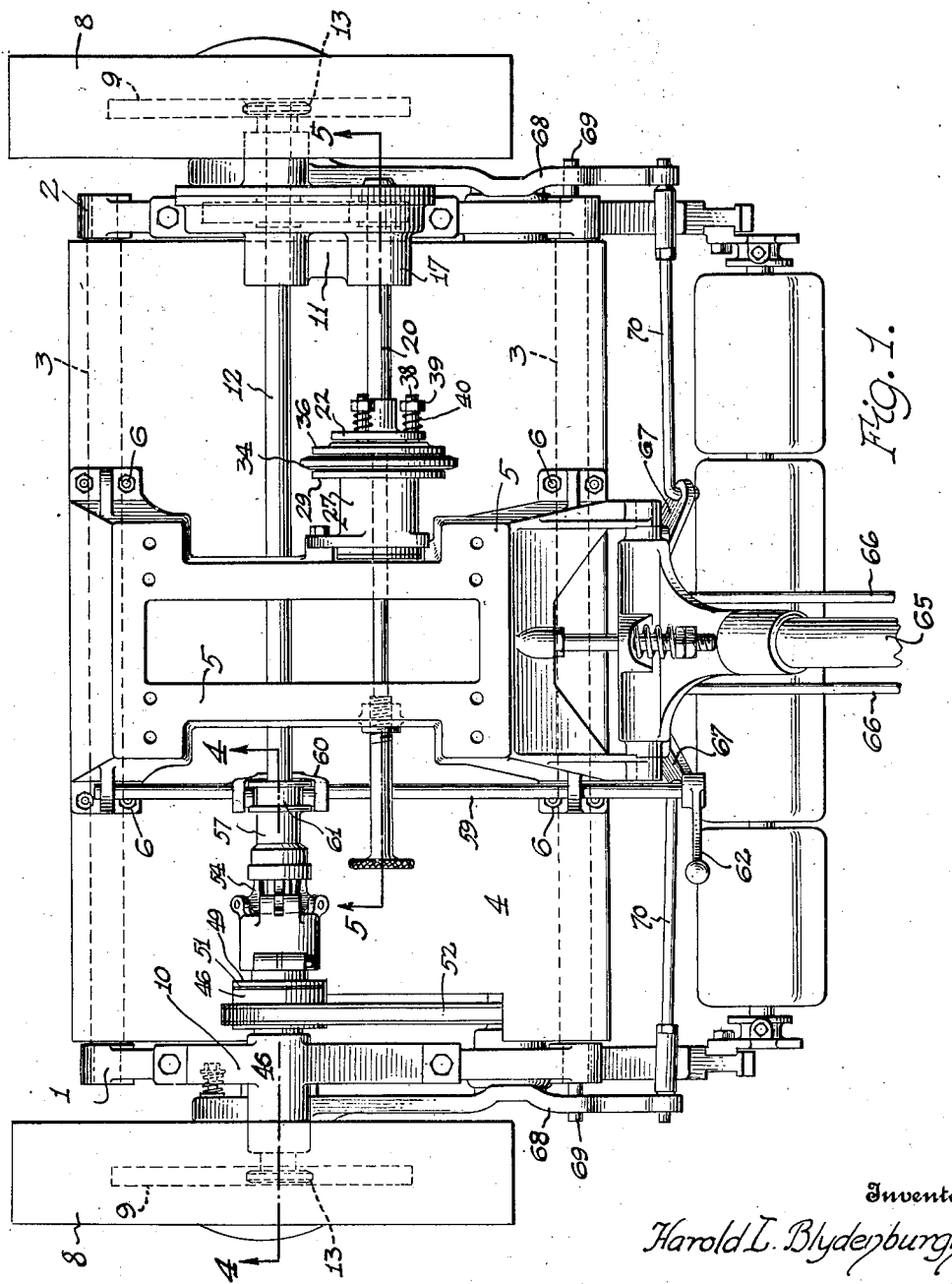
Figure 1 is a plan view of the device.

The frame of the machine is constructed of end members 1 and 2 joined and held together by means of tie rods 3. Upon the rods is mounted a cover plate 4 extending therebetween as clearly shown in Figures 1 and 2. Upon the cover plate in turn is mounted a base or support 5 for the motor, secured in position by U-bolts 6 at the ends thereof straddling the rods 3. A motor 7 of suitable or desired construction is mounted and secured upon the base member 5.

Figure 2:
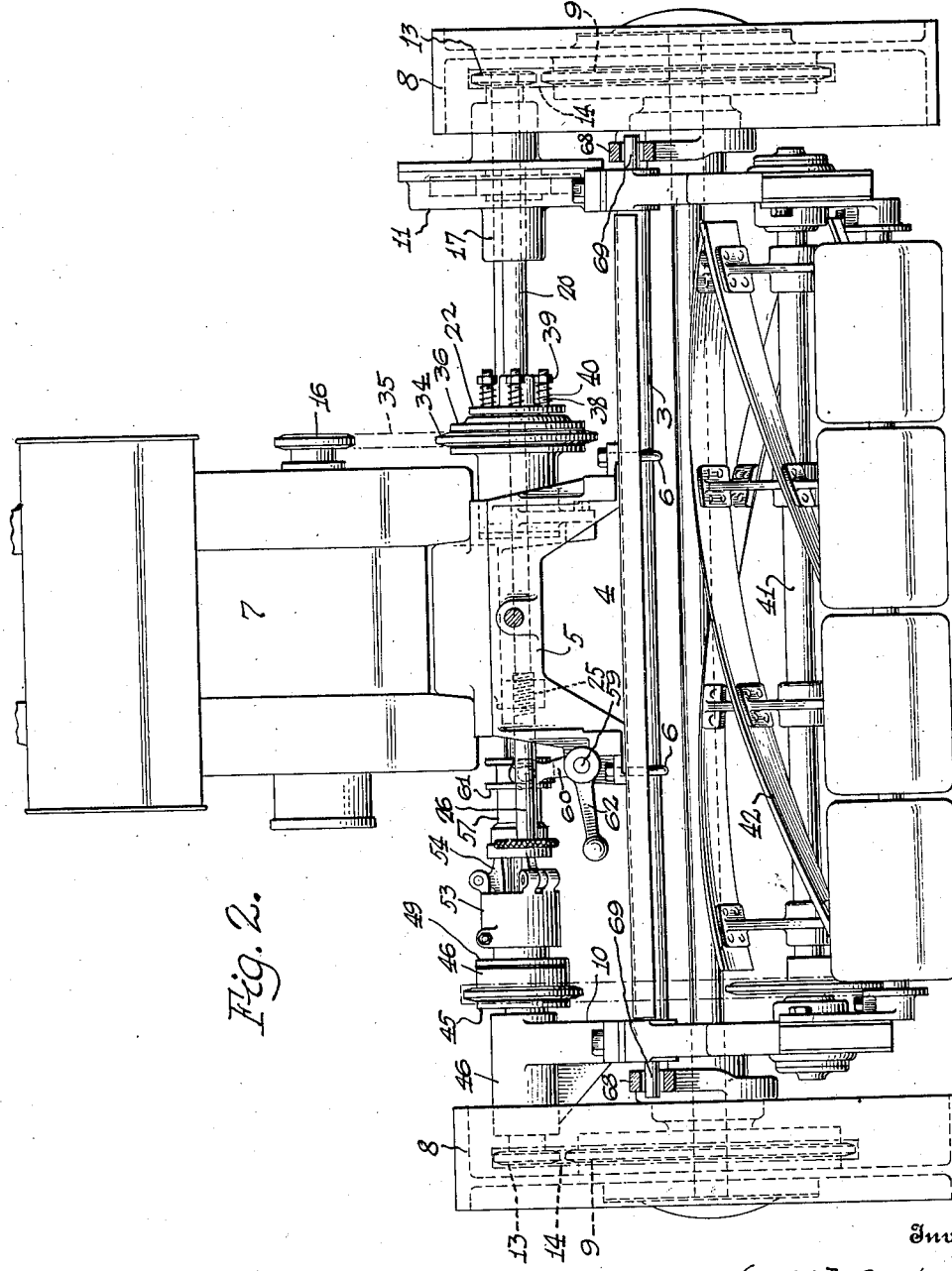
Fig. 2 is an elevation at the rear side of the machine.

Ground wheels 8 are journalled to the end frames 1 and 2 and carry sprocket wheels 9 for driving purposes as will presently appear. Upon the end frames 1 and 2 are secured bearing members 10 and 11 respectively, in which is mounted a driven shaft 12 carrying pinions 13 at its ends geared to the sprocket wheels 9 by chains 14 as illustrated in Figures 2 and 3.

The shaft 15 of the motor carries a small sprocket wheel 16 as may be seen in Figure 3. In a bearing element 17 formed in the member 11 is journalled a pinion 18 having a hollow hub 19 extending into the bearing element, the pinion being geared to drive the shaft 12 and housed within the member 11 as illustrated in Figure 5. One end of a countershaft 20 is received in the element 17 and splined therein as indicated by the numeral 21. The shaft is disposed entirely at one side of the motor base 5, and the remaining end thereof has a disk 22 fixedly mounted thereon and receiving a wear button 23 of hard metal.

A stem or rod 24 is threaded at 25 in the frame 5 and is equipped with an external knurled button or handle 26 for manipulation. The stem extends into close proximity to the button 23 as shown in Figure 5. The stem is surrounded near its free end by a bearing cage 27 secured to the member 5 by bolts 28. Adjacent the button 23 is a friction disk 29 having a hub 30 rotatably mounted on the stem 24 and surrounded by roller bearings 31 which are in turn enclosed by the cage 27. One end of the cage is engaged by the disk 29, and the other end receives a cap or plug 32 threaded into the hub 30 to draw the disk 29 firmly against the cage 27.

The disk 29 also has a hub 33 loosely surrounded by a sprocket wheel 34 in line with the member 16 and geared thereto by a chain 35. On the hub is also mounted another friction disk 36 engaged by the wear button 23.

The disks 29 and 36 are disposed at opposite sides of the member 34, and suitable friction material 37 for clutch purposes is interposed, carried, either by the disks or the sprocket wheel 34. Pins 38 are passed slidably through the members 22 and 36 and into the hub 33 and are anchored in the latter. Each such pin has a head or nut 39 at the outer side of the disk 22 and is surrounded by a spring 40 bearing against the disk and head or nut. The tendency of these springs is to move the slidable shaft 20 towards the stem 24, thus bringing the clutch parts 29, 34 and 36 together to establish a driving relation between the shaft 20 and wheel 34. In order to release the clutch to disconnect the motor from the ground wheels 8, it is merely necessary to turn the stem 24 by its handle 26 in the direction which moves it towards the shaft 20, wherein the free end of the stem abuts the disk 26 and moves the same in the direction of the bearing 17, at the same time sliding the shaft 20 farther into the bearing, against the action of the springs 40.

The driven shaft 12 which is geared directly to the ground wheels is also adapted to drive the cutter through an interposed clutch as will presently appear. The cutter consists of a shaft 41 journalled in the end frames 1 and 2 and carrying cutter blades 42 in the usual manner.

The clutch controlling the operation of the cutter includes a sleeve 43 keyed to the shaft 12 at 44 and having a frame 45 which abuts the adjacent bearing 10. On the sleeve is rotatably mounted a collar 46 carrying sprocket wheel 47 adjacent the flange 45, with friction material 48 inserted between the flange and the wheel. At the other side of the collar, the sleeve carries a hub 49 slidably keyed to the sleeve as indicated by the numeral 50, and friction material 51 is inserted between this hub and the collar 46. The sprocket wheel 47 is suitably geared to the cutter shaft 42 as indicated by the numeral 52 in Figures 3 and 4.

On the hub 49 is securely mounted a ring 53 having levers 54 pivotally mounted on the rear end thereof. Into the free end of the sleeve 43 is threaded a flanged member 55 surrounding the shaft 12 and disposed within the ring 53. A spring 56 is interposed between the flanged member and the hub 49, and the flanged member is further engaged by the levers 54.

On the shaft 12 is slidably mounted a shifting sleeve 57 having a conical cavity 58 receiving the ends of the levers 54. An operating shaft 59 is suitably journalled transversely of the machine and carries a fork 60 engaging the collar 61 on the sleeve 57. On the end of this shaft at the rear side of the machine is secured a crank 62 which may be moved by the foot of the operator to actuate the clutch. Normally, the spring 56 tends to move the hub 49 and wheel 47 against the flange 45, thereby pressing various parts together and into firm engagement with the friction material, so that a drive is established from the shaft 12 to the wheel 48 through the keyed members 43 and 49.

To release the clutch, the shaft 59 is turned in the direction to move the sleeve 57 towards the levers 54. The ends of the levers received in the cavity 58 are thereby drawn towards the shaft and fulcrum on the remaining ends which engage the member 55. The ring 53 is thus drawn towards the sleeve 57 against the action of the spring 56 or, in other words, the wheel 47 is drawn away from the disk or flange 45.

The push rod 65 of the machine has a pair of rods 66 parallel thereto at opposite sides thereof and shiftable by means of the handle bars, not shown herein but illustrated in my copending application Serial No. 419,421, filed January 8, 1930. Rocker arms 67 are pivotally attached to the frame of the machine and connected respectively to the rods 66. On the side members 1 and 2 are provided levers 68 mounted on pins 69. The rear end of each of these levers is joined to the adjacent rocker arm 67 by a link 70, and the remaining ends of the levers are adapted to operate individual clutches (not shown) for the ground wheels. These clutches are separately operable from the handle bars whereby the machine may be steered by releasing one or the other of the clutches as described in the aforementioned application.

Although a specific embodiment of the invention has been illustrated and described, it will be understood that various alterations in the details of construction may be made without departing from the scope of the invention, as indicated by the appended claim.

What I claim is:—

In a lawn mower, a frame structure, ground wheels carried thereby, a countershaft carried by said frame and geared to said ground wheels, a clutch mounted on said countershaft and having an element fixed to rotate with said shaft, another element adapted for engagement and disengagement with respect to the first named element, a motor carried by said frame and geared to the second named clutch element, a cutter shaft journalled in said frame, a driven shaft geared to said counter-shaft and controlled by said clutch, a clutch mounted on said driven shaft and having an element adapted to be coupled and uncoupled with respect to said driven shaft, said element being geared to said cutter shaft.

In testimony whereof I affix my signature.

HAROLD L. BLYDENBURGH.